Sept. 13, 1932. M. DE BERNARDI 1,877,499
COMBINED STEERING AND STABILIZING CONTROL DEVICE FOR AIRCRAFT
Filed June 15, 1931 3 Sheets-Sheet 3
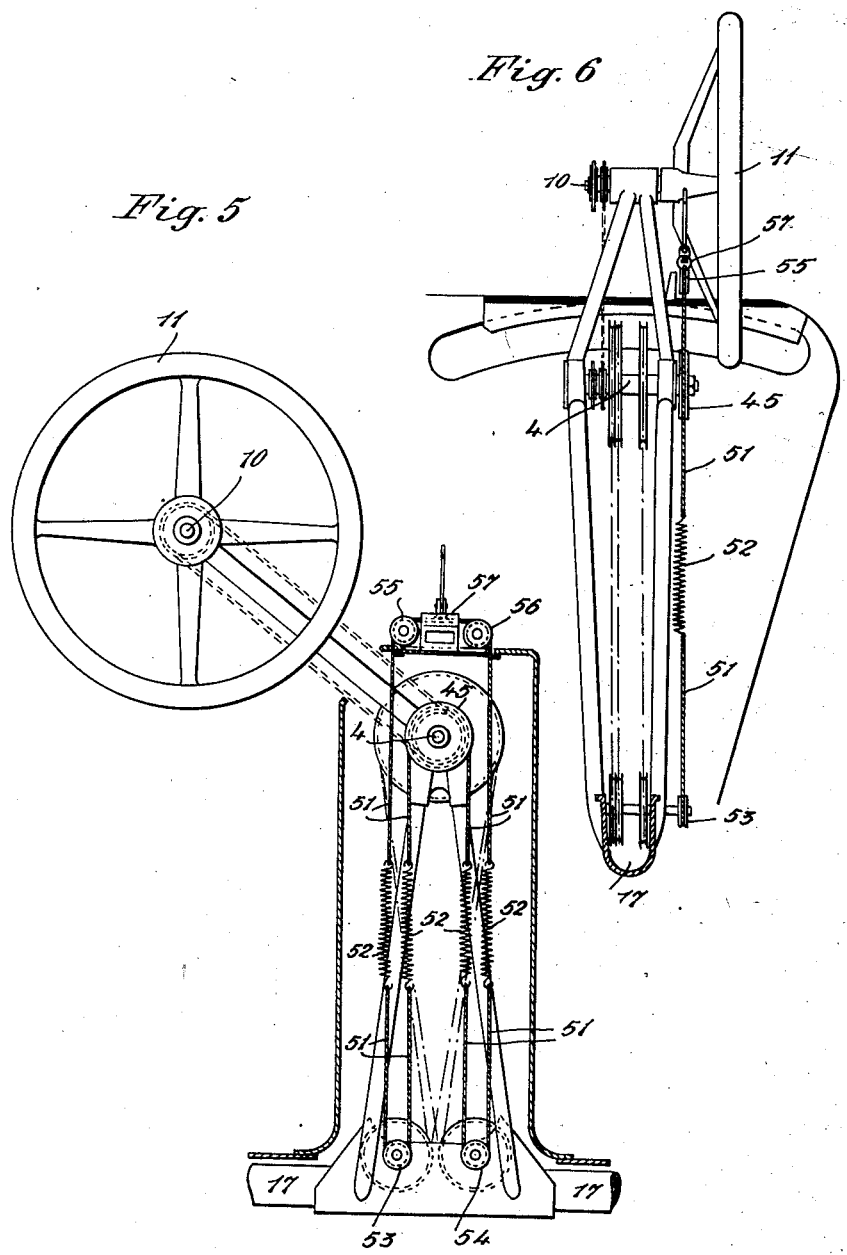

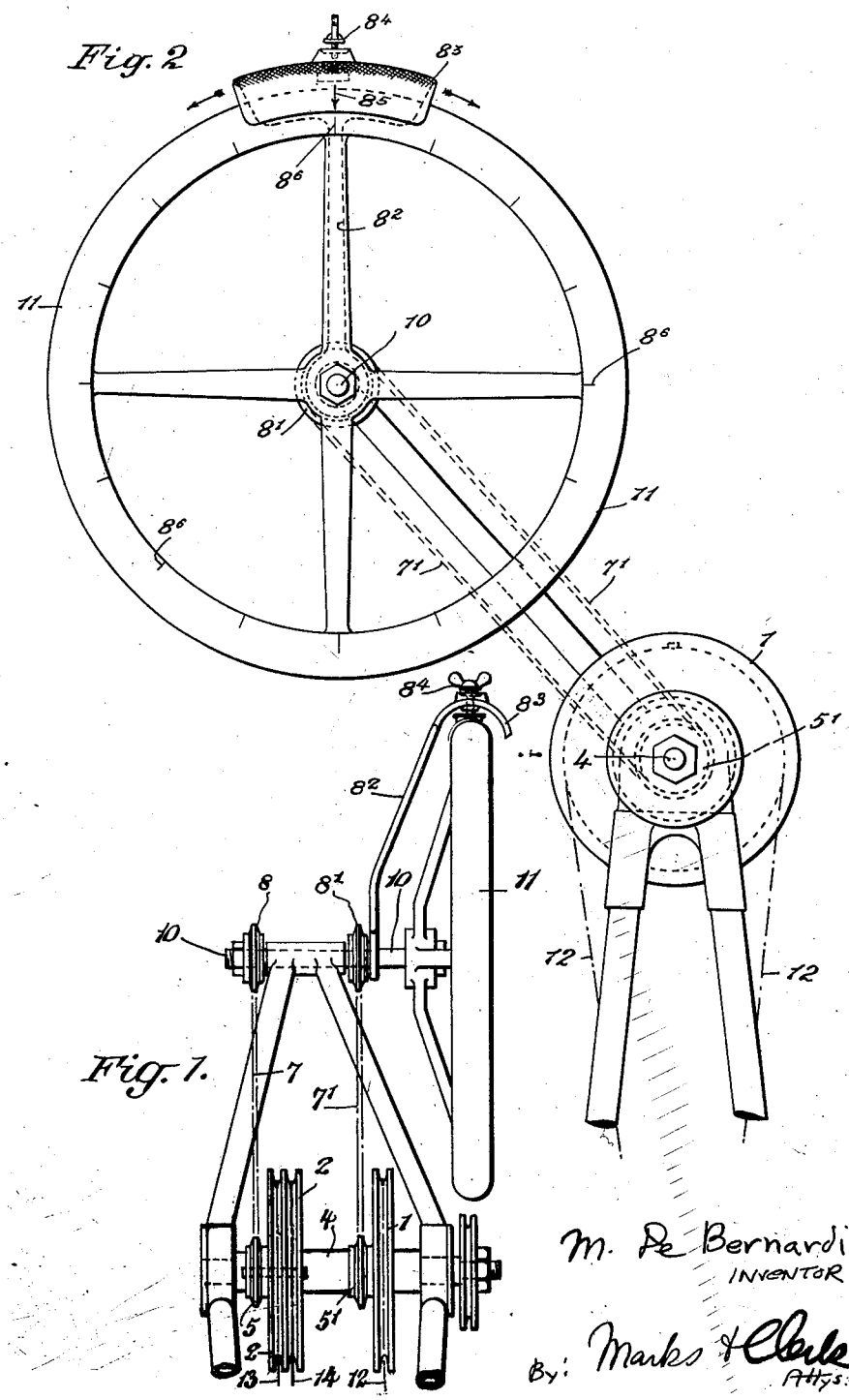

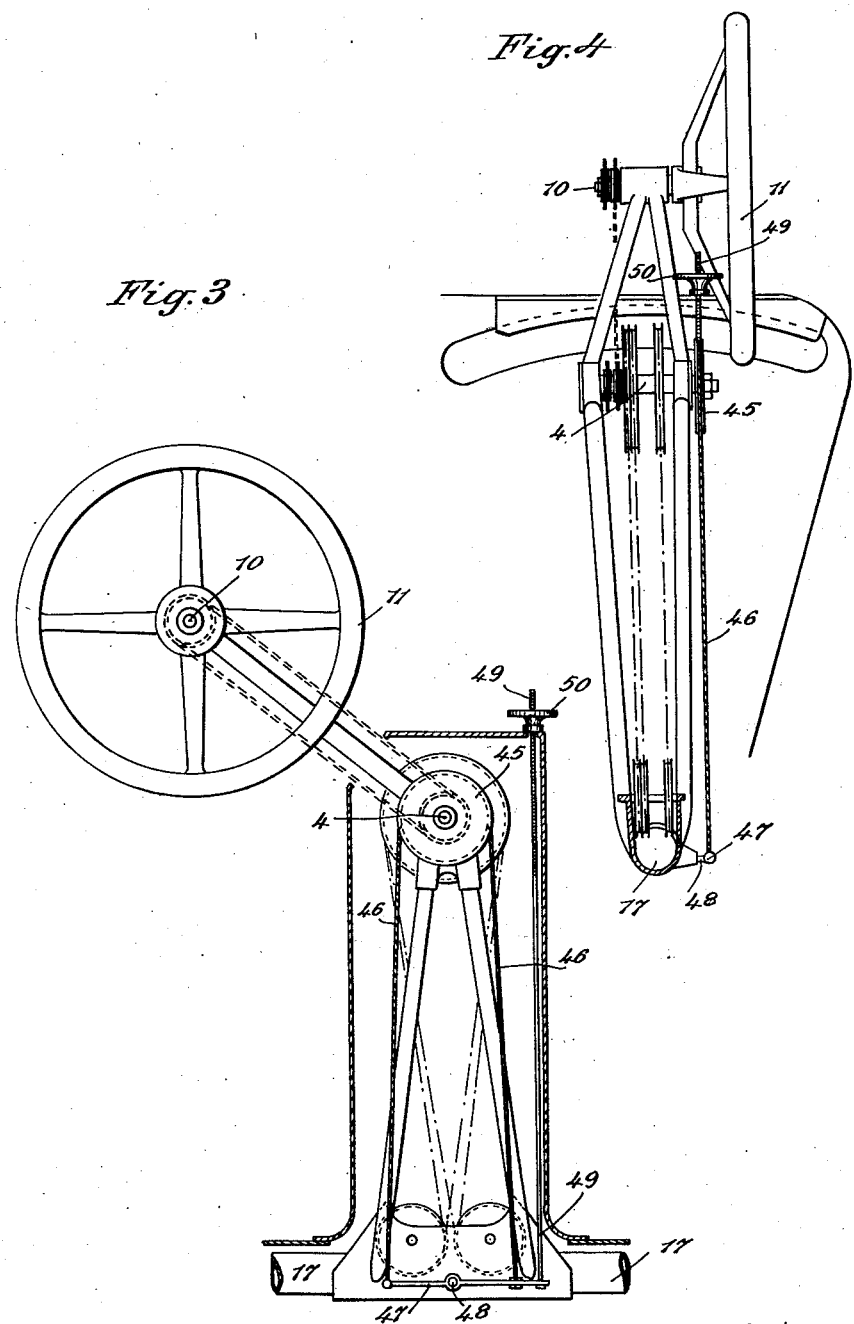

Patented Sept. 13, 1932

1,877,499

UNITED STATES PATENT OFFICE

MARIO DE BERNARDI, OF ROME, ITALY

COMBINED STEERING AND STABILIZING CONTROL DEVICE FOR AIRCRAFT

Application filed June 15, 1931, Serial No. 544,581, and in Italy May 11, 1931.

My present invention is an improvement of my prior U. S. application Ser. No. 493,662 filed on Nov. 5th, 1930 and a first object of my present invention is to separate the transmission of rotary movement of steering wheel to the steering rudder from that to the ailerons, and a second object is to provide a device for restoring the control member to a determined position adapted for giving the apparatus any desired direction of flight.

As to the said first improvement it is to be kept in mind that it may become necessary to change the relative position of ailerons and steering rudder, for instance in a three-motor apparatus in which one lateral motor ceases operating. In this case it is necessary to correct the want of equilibrium with the steering rudder without simultaneously occurring displacements of ailerons. It is, in other words, necessary that a zero position of ailerons corresponds to a certain position, other than zero, of the steering rudder so as to rectify the behaviour of the apparatus.

In order to apply this improvement to aircraft provision is to be made so that the transmission to the steering rudder may be, at the will of pilot, disconnected from the suitably shifted rotary movement of the steering wheel and thereupon re-connected and made solidary with the rotary movement of the steering wheel.

Thus the control member acts always in equal measure on the steering rudder and the ailerons though starting from initial relative positions of steering rudder and ailerons which may be varied at will by the pilot.

Figures 1 and 2 show schematic side and front views respectively of the control device according to application No. 493,662 provided with the device according to the present application uniting under a single control and in a constant proportion to each other the movement of the ailerons and vertical rudder.

Figures 3 and 4 show schematic front and side views respectively of one modification of the elastic device for pulling off the single control organ, while Figures 5 and 6 show schematic front and side views respectively of another form of the pulling off device.

My said first improvement is diagrammatically shown in Figs. 1 and 2 of the drawings, which show the improved single control member described and illustrated in my said prior application, the reference numerals being the same for similar parts.

1 is the pulley and 12 the cable relating thereto, both controlling the steering rudder; 2 is the double grooved pulley and 13 and 14 the relative aileron controlling cables. 4 is the common axe on which the said pulleys are mounted. 5 is the sprocket wheel which by the sprocket chain 7 receives the movement from sprocket wheel 8 solidary with shaft 10 of steering wheel 11. Pulley 2 is fixed on shaft 4, whilst pulley 1 is loose together with its pinion $5^1$ and connected by chain $7^1$ to pinion $8^1$ loose on shaft 10.

To pinion $8^1$ the end of a lever $8^2$ is fixed whilst its other end is bent on steering wheel so as to form a handle $8^3$ provided with a device $8^4$ for fixing lever $8^2$ to steering wheel 11.

In order to change position of steering rudder with relation to ailerons the pilot has to grip handle $8^3$ of lever $8^2$ and shift same to the right or left of steering wheel. In these movements the said lever fixed to loose pinion $8^1$ by chain $7^1$ in engagement with pinion $5^1$ of loose pulley 1— causes the latter to rotate, this movement being transmitted to the steering rudder by cable 12 fixed to said pulley 1.

Index $8^5$ and marks of reference $8^6$ on the steering wheel indicate the relative position between steering rudder and ailerons. A device $8^4$ is provided on lever $8^2$ for fixing same to steering wheel thereby to make the steering wheel and ailerons solidary in their movement.

My second improvement regards a device for restoring the single control member to a determined position adapted for giving the apparatus any desired direction of flight.

It is to be kept in mind that the position of steering rudder and ailerons which give the apparatus a determined direction of flight are in function of the distribution of the forces acting on the apparatus, particularly the dissymmetry occurring in this distribution owing to various causes such as the influence of rotation of propeller, the profile divergency of ailerons, the variations produced in the latter by the work done in flight, and the effects of these causes may also be different according to the actual conditions of flight such as temperature of air, height of flight, latitude, and so forth.

In order to practically carry out my said second improvement provision is to be made that the movements of control member acting on the steering rudder and ailerons produce,—starting from a certain central position, and in both directions,—the deformations of an elastic means and thereby the forces necessary for restoring to said central position the control member without checking the movements or producing oscillations.

The production of deformations in the elastic means is bound to its initial balanced position. The pilot by changing this initial position of equilibrium adjusts the central position to which the control member is to be restored, and has consequently at his disposal a means for causing to coincide with this position of restoring of central member that position of the latter which gives the apparatus the direction of flight desired.

Referring to Figures 3 to 6 inclusive, 11 is the single control member its rotation about it axe 10 controlling both the ailerons and the steering rudder.

Circular shiftings of the steering wheel about the pivotal axe 17 of its support act on the horizontal rudder. In the first modification of this improvement shown in Figs. 3 and 4,—45 is a pulley solidary with the common axe of the cable pulleys so that the steering wheel and pulley rotate solidarily about their axes. Around the peripherical groove of the pulley an elastic ribbon 46 is fixed the ends of which engage the terminal points of a lever 47 fulcrumed at 48. Pulley 45 tends to attain the equilibrium position by which the tension of the elastic ribbon is kept uniform.

By rotating the lever 47 on its fulcrum 48 the engagement distances of the elastic ribbon 46 with regard to pulley 45 are altered, and thereby its equilibrium position is influenced. Lever 47 is operated by a rigid screw threaded rod 49 for its shifting about its fulcrum 48, and the pilot by means of knob 50 or other equivalent member controls the final equilibrium position of steering wheel 11.

In the second modification of my said improvement, shown in Figs. 5 and 6, around the peripherical groove of pulley 45 a rigid rope 51 is fixed, provided with elastic members 52 and sliding in the grooves of pulleys 53—34—55—56. Said rope at 57 passes into a braking device adapted for locking at that point pilot's controlling rope.

In order to adjust the initial position of equilibrium of the system the fixing device is loosened and the steering wheel 11 is shifted to the position desired. The rope carried along by pulley 45 slides freely in the other pulleys. Thereupon the braking device is operated to lock the rope whereby each successive rotation of steering wheel will produce a deformation in the elastic parts 52 which thus will tend to restore the system to its pre-established initial position.

Having now particularly described and ascertained the nature of my said invention and in what manner the same is to be performed, I declare that what I claim is:

1. In a combined aircraft steering and stabilizing control device of the type having a support for a common shaft and having a steering wheel and its supporting shaft also mounted thereon and further having operable connections between the shaft of the wheel and the common shaft and between the common shaft and the steering rudder and the ailerons of the aircraft, means for loosely mounting the operable connections between the hand wheel supporting shaft and the steering rudder, and means for releasably fixing the last mentioned operable connection to the hand wheel.

2. In a combined aircraft steering and stabilizing control device as claimed in claim 1, wherein the operable connections between the hand wheel and steering rudder include loosely mounted sprocket wheels on the hand wheel supporting shaft and on the common shaft, a chain operating about said sprocket wheels and wherein the means for releasably fixing the said mentioned operable connections includes a lever fixed with the sprocket wheel on the hand wheel supporting shaft and terminating in a handle disposed about the rim of the steering wheel, and means for releasably clamping the handle to the hand control wheel.

3. In a combined aircraft steering and stabilizing control device as claimed in claim 1, wherein the operable connections between the hand wheel and steering rudder include loosely mounted sprocket wheels on the hand wheel supporting shaft and on the common shaft, a chain operating about said sprocket wheels and wherein the means for releasably fixing the said mentioned operable connections includes a lever fixed with the sprocket wheel on the hand wheel supporting shaft and terminating in a handle disposed about the rim of the steering wheel, means for releasably clamping the handle to the hand control wheel, and cooperating indicating means on the handle and hand wheel for indicating relative positions between the steering rudder and ailerons.

4. In a combined aircraft steering and stabilizing control device of the type having a support for a common shaft and for another shaft carrying a hand control wheel and having operable connections between both of the shafts and between the common shaft and the steering rudder and ailerons of the aircraft and having means for rendering the transmission of movement from the hand wheel to the steering rudder inactive, a device for restoring to a pre-established position the hand control wheel relative to its movement for operating the steering rudder and ailerons, said device including elastic means operably connected with the common shaft which are deformed for carrying out the said movements and act to restore the wheel to the pre-established initial position when the deformation ceases in combination with a mechanical means for varying at the will of the pilot the position of the hand control wheel in which the elastic means is in equilibrium.

5. In a combined aircraft steering and stabilizing control device as claimed in claim 4, wherein the restoring device includes a grooved pulley rigidly fixed to the common shaft, an elastic ribbon connected thereto, a rod having one end connected to one end of the lever, and a control knob adjustably mounted on the opposite end of the rod.

6. In a combined aircraft steering and stabilizing control device as claimed in claim 4, wherein the restoring device includes a grooved pulley fixed to the common shaft, auxiliary pulleys, a manually operable braking device, and a knob fixed to the grooved pulley and trained about the auxiliary pulleys and through the braking device and including elastic members insertable therein and forming a part thereof, substantially as and for the purposes set forth.

In testimony whereof I have hereunto signed my name.

MARIO DE BERNARDI.